US008452131B2

(12) United States Patent
Connell, II et al.

(10) Patent No.: US 8,452,131 B2
(45) Date of Patent: May 28, 2013

(54) IRIS RECOGNITION SYSTEM AND METHOD

(75) Inventors: Jonathan H. Connell, II, Hawthorne, NY (US); James E. Gentile, Hawthorne, NY (US); Nalini K. Ratha, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 880 days.

(21) Appl. No.: 12/567,362

(22) Filed: Sep. 25, 2009

(65) Prior Publication Data
US 2011/0075893 A1 Mar. 31, 2011

(51) Int. Cl.
G06K 9/54 (2006.01)

(52) U.S. Cl.
USPC ........................................................ 382/305

(58) Field of Classification Search
USPC .................. 382/117, 216, 296, 305; 707/698, 707/745, 747, 749
See application file for complete search history.

(56) References Cited

U.S. PATENT DOCUMENTS

| 6,247,813 | B1 | 6/2001 | Kim et al. |
| 6,526,160 | B1 | 2/2003 | Ito |
| 6,871,287 | B1 | 3/2005 | Ellingson |
| 7,269,277 | B2 | 9/2007 | Davida et al. |
| 7,272,245 | B1 | 9/2007 | Layton |
| 7,277,561 | B2 | 10/2007 | Shin |
| 7,331,667 | B2 | 2/2008 | Grotehusmann et al. |
| 7,444,007 | B2 | 10/2008 | Schonberg et al. |
| 7,483,569 | B2 | 1/2009 | Bhagavatula et al. |
| 2005/0207614 | A1* | 9/2005 | Schonberg et al. ........... 382/100 |
| 2008/0126809 | A1 | 5/2008 | Rothschild |

FOREIGN PATENT DOCUMENTS

| JP | 2009077259 A1 | 4/2009 |
| WO | WO2009034498 A1 | 3/2009 |

OTHER PUBLICATIONS

Qiu, X., et al. "Coarse Iris Classification by Learned Visual Dictionary" Advances in Biometrics, International Conference, ICB 2007. Aug. 2007. pp. 770-779.*
Proenca, H., et al. "Toward Noncooperative Iris Recognition: A Classification Approach Using Multiple Signatures" IEEE Transactions on Pattern Analysis and Machine Intelligence, vol. 29, No. 4. Apr. 2007. (6 Pages).*
Bolle, R., et al. Iris Individuality: A Partial Iris Model. Proceedings of the 17th International Conference on Pattern Recognition (ICPR'04). vol. 2. Aug. 2004. pp. 927-930.
Broussard, R., et al. Identifying Discriminatory Information Content Within the Iris. In Proceedings SPIE Defense and Security Conference. International Institute of Informatics and Systemics. Mar. 2008. vol. 6944, pp. 69440: T1-T11.

(Continued)

Primary Examiner — Gregory F Cunningham
(74) Attorney, Agent, or Firm — Tutunjian & Bitetto, P.C.

(57) ABSTRACT

A system and method for performing an identity search in a database of iris images for a probe iris image includes generating a full-length iris code and a compact iris code for iris images in a database, and generating a full-length iris code and a compact iris code for a probe iris image. The compact iris code for the probe image is scored against all compact iris codes in the database. A fraction of the database is retained based on score data. The full length iris code for the probe image is scored against all the full length iris codes in the retained portion of the database.

23 Claims, 6 Drawing Sheets

OTHER PUBLICATIONS

Daugman, J., et al. How Iris Recognition Works. IEEE Transactions on Circuits and Systems for Video Technology. vol. 14, No. 1. Jan. 2004. pp. 21-30.

Daugman, J. The Importance of Being Random: Statistical Principles of Iris Recognition. The Journal of Pattern Recognition Society. Dec. 2001. pp. 279-291.

Daugman, J. Probing the Uniqueness and Randomness of Iris Codes: Results From 200 Billion Iris Pair Comparisons. Proceedings of the IEEE. Vol. 94, No. 11. Nov. 2006. pp. 1927-1935.

Du, Y., et al. Analysis of Partial Iris Recognition. Presented at SPIE Defence and Security Symposium, 2004. Proceedings of the 2005 SPIE Defense and Security Symposium, vol. 5779. Mar. 2005. pp. 31-40.

Du, Y., et al. Analysis of Partial Iris Recognition Using 1-D Approach. In ICASSP '05: Proceedings of the International Conference on Acoustics, Speech, and Signal Processing. Mar. 2005. vol. 2. pp. II/961-II/964.

Fitzgibbon, A., et al. Direct Least Square Fitting of Ellipses. IEEE Transactions on Pattern Analysis and Machine intelligence. vol. 21, No. 5. May 1999. pp. 476-480.

Hollingsworth, K., et al. The Best Bits in an Iris Code. IEEE Transactions on Pattern Analysis and Machine Intelligence. vol. 31, No. 6. Jun. 2009. pp. 964-973.

Monro, D.,et al. Rotation Compensated Human Iris Matching. Proc. IEEE Workshop on Signal Processing Applications for Public Security and Forensics. Apr. 2007. pp. 1-4.

Mukherjee, R., et al. Indexing Iris Images. In ICPR08. Appeared in Proc. of International Conference on Pattern Recognition (ICPR). Dec. 2008. pp. 1-4.

Roy, K., et al. Optimal Features Subset Selection Using Genetic Algorithms for Iris Recognition. Jun. 2008. pp. 894-904.

Sanchez, R., et al. Iris Recognition With Low Template Size. In AVBPA '01: Proceedings of the Third International Conference on Audio-and-Video-Based Biometric Person Authentication. Jun. 2001. pp. 324-329.

Wildes, R., et al. Iris Recognition: An Emerging Biometric Technology. Proceedings of the IEEE. vol. 85, No. 9. Sep. 1997. pp. 1348-1363.

Zuo, J., et al. A New Approach for Iris Segmentation. IEEE Computer Society Conference on Computer Vision and Pattern Recognition Workshops. Jun. 2008. pp. 1-6.

Bowyer, K., et al. "Image Understanding for Iris Biometrics: A Survey" Computer Vision and Image Understanding. vol. 110, No. 2. May 2008. pp. 1-37.

Du, Y., et al. "Analysis of Partial Iris Recognition" SPIE Defense and Security Symposium. Proceedings of the SPIE Defense, vol. 5779. Mar. 2005. (9 Pages).

Masek, L. "Recognition of Human Iris Patterns for Biometric Identification" Master Thesis, University of Western Australia. 2003. (61 Pages).

Sun, Z., et al. "Graph Matching Iris Image Blocks With Local Binary Pattern" Advances in Biometrics, International Conference, ICB 2006. Jan. 2006. pp. 366-372.

Vatsa, M., et al. "Improving Iris Recognition Performance Using Segmentation, Quality Enhancement, Match Score Fusion, and Indexing" IEEE Transactions on Systems, Man, and Cybernetics—Part B: Cybermetics. vol. 38, No. 4. Aug. 2008. pp. 1-15.

Chin, C., et al. High Security Iris Verification System Based on Random Secret Integration. Computer Vision and Image Understanding. INSPEC. Mar. 2006. pp. 169-177.

Deering. A Photon Accurate Model of the Human Eye. Proceedings of ACM SIGGRAPH 2005. ACM Digital Library. Jul. 2005. pp. 649-659.

Dozier, et al. Minimizing the Number of Bits Needed for Iris Recognition Via Bit Inconsistency and Grit. IEEE Workshop on Computational Intelligence in Biometrics: Theory, Algorithms, and Applications, 2009, CIB 2009. INSPEC/IEEE. Mar. 2009. (8 pages).

Hollingsworth, et al. The Best Bits in an Iris Code. IEEE Transactions on Pattern Analysis and Machine Intelligence. INSPEC/IEEE. vol. 31, No. 6. Jun. 2009. pp. 964-973.

Nath, et al. IRISNET: An Architecture for Internet-Scale Sensing Devices. Proceedings of the 29th VLDB Conference. ACM Digital Library. 2003. (4 pages).

Ring, et al. Detection of Iris Texture Distortions by Analyzing Iris Code. 2nd IEEE International Conference on Biometrics: Theory, Applications and Systems, 2008. BTAS 2008. INSPEC/IEEE, Sep. 2008, pp. 1-6.

* cited by examiner

IRIS RECOGNITION SYSTEM AND METHOD

BACKGROUND

1. Technical Field

The present invention relates to iris recognition and more particularly to an efficient and accurate iris sensor and recognition system and method.

2. Description of the Related Art

Very high information content exists in iris texture. This makes the iris attractive for large scale identification systems with possibly millions of people. However, conventional identification systems typically operate by performing N 1:1 matches of a probe against a database. This can get prohibitively expensive in terms of computation as N grows large. Note that for identification systems the per-match time dominates system performance especially when the gallery size exceeds the feature size, unlike verification where feature extraction time is the primary component.

The iris is rich in textural features which can be used to describe individuals for identification. The iris can be segmented and unwrapped into a rectangular image. From the unwrapped iris, texture is extracted by applying a Gabor filter bank. This is encoded into a binary image, known as the iris code, which serves as the feature vector for recognition. Personal identity is determined by measuring the distance between two such feature vectors.

In an identification system, one iris code (the probe) is matched to an entire database of iris codes (the gallery). If the distance between the probe and gallery is below a certain threshold, the probe and gallery are said to match and be of the same person. This matching scheme is known as a 1:N system because the probe is matched to N gallery instances. The computational requirement of an identification system is dependent on the size of the input iris code, the number of instances in the gallery, and an alignment search range. In many cases, the size of the gallery can grow so large that real-time recognition quickly becomes expensive. Systems with 200 billion iris code comparisons are possible.

Several approaches have been taken to speed up the time taken for iris recognition. In one system, the recognition workload is spread across a set of processes. Iris textures are unwrapped and aligned using Fourier components of the iris texture rather than full search. Other work aims at reducing the size of the feature vector for recognition. Genetic algorithms are used to reduce the feature space of an iris code. PCA is used to reduce the size of the iris representation. In addition, each probe is assigned to an inductively learned cluster and then only gallery codes from the same cluster are tested.

SUMMARY

A system and method for performing an identity search in a database of iris images for a probe iris image includes generating a full-length iris code and a compact iris code for iris images in a database, and generating a full-length iris code and a compact iris code for a probe iris image. The compact iris code for the probe image is scored against all compact iris codes in the database. A fraction of the database is retained based on score data. The full length iris code for the probe image is scored against all the full length iris codes in the retained portion of the database.

A system for performing an identity search in a database of iris images for a probe iris image includes a database configured to store a full-length iris code gallery and a compact length iris code gallery, and a scanner configured to obtain a full-length iris code for a probe iris image. A transform program is configured to generate a compact iris code from the probe iris image. A processing module is configured to score the compact iris code for the probe image against all compact iris codes in the database, retain a fraction of the database based on score data, and score the full length iris code for the probe image against all the full length iris codes in the retained portion of the database to output best matches to determine an identify associated with the probe iris image.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
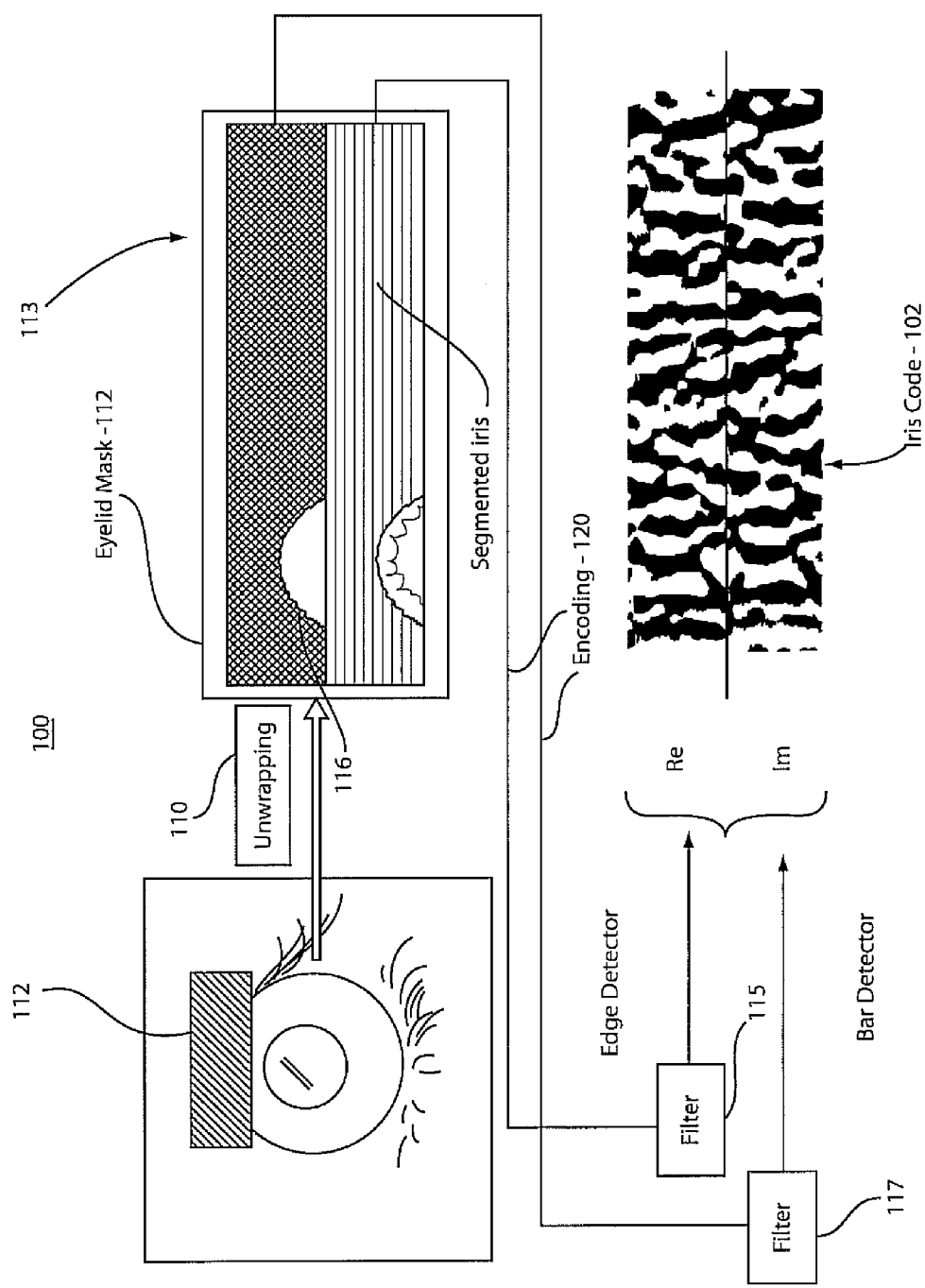
FIG. 1 is a diagram showing generation of iris codes.

The present principles use a short-length iris code to pre-screen a large database and thereby reduce the number of full comparisons needed to a fraction of the total. Since the screening code is much smaller than the full iris code, the time to process the whole database is greatly reduced. As an added benefit, the alignment interred from the short code is employed to greatly restrict the range of alignments searched for the full code, which further speeds up the system. Our experiments demonstrate a two stage approach that can reduce the cost and/or time needed by an order of magnitude with very little impact on identification performance.

An identification system based on a two-tier indexing scheme is provided. A shorter representation of the iris is used to pre-align the probe to each gallery sample and generate a shortlist of match candidates. These are then compared to the probe using the more expensive full iris code at a second tier. Since the majority of non-match candidates are sorted out at the first tier with minimal effort, the result is a faster recognition system.

The present method includes all transforms and alignments that are iris-code based. Thus, the present principle can be deployed on any existing system which uses iris codes—no additional feature computations are needed.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to the drawings in which like numerals represent the same or similar elements and initially to FIG. 1, an iris code 102 is an individual descriptor in an iris recognition system 100. The iris code 102 is a binary image that encodes a texture of the iris. The various stages in the generation of an iris code include unwrapping the iris in block 110, computing an eyelid mask in block 112, and generating the full length iris code 102. To generate an iris code, the iris is first segmented from an image and non-rigidly unwrapped into a rectangular template. Then, two filter masks 115 and 117 are convolved over the unwrapped iris (encoding 120) and the sign of each pixel's response is used to encode that pixel. The collective responses to the odd filter 115 are referred to as the real (RE) portion of the iris code, and the responses to the even filter 117 are known as the imaginary (IM) portion (e.g., edge detection kernel and bar detection kernel filters respectively). In the event that a pixel is occluded by an eyelid in the original image (e.g., a "bite" 116), that pixel is removed from comparison in the iris code. There are many variants on this scheme.

In recognition, two iris codes are said to match (correspond to the same eye) if the normalized Hamming distance between them is less than a pre-defined threshold. The normalized Hamming distance is the number of unmasked bits that differ between the codes divided by the total number of unmasked bits. The equation for the Normalized Hamming distance between two iris codes (A and B) with occlusion masks may include:

$$HD(A, B) = \frac{\|(A \oplus B) \wedge A_{mask} \wedge B_{mask}\|}{\|A_{mask} \wedge B_{mask}\|}. \quad (1)$$

An iris recognition system 100 also needs to compensate for changes in rotation by aligning iris codes. Two codes of the same eye can differ because of head tilt relative to the camera at the time of acquisition.

Figure 2:
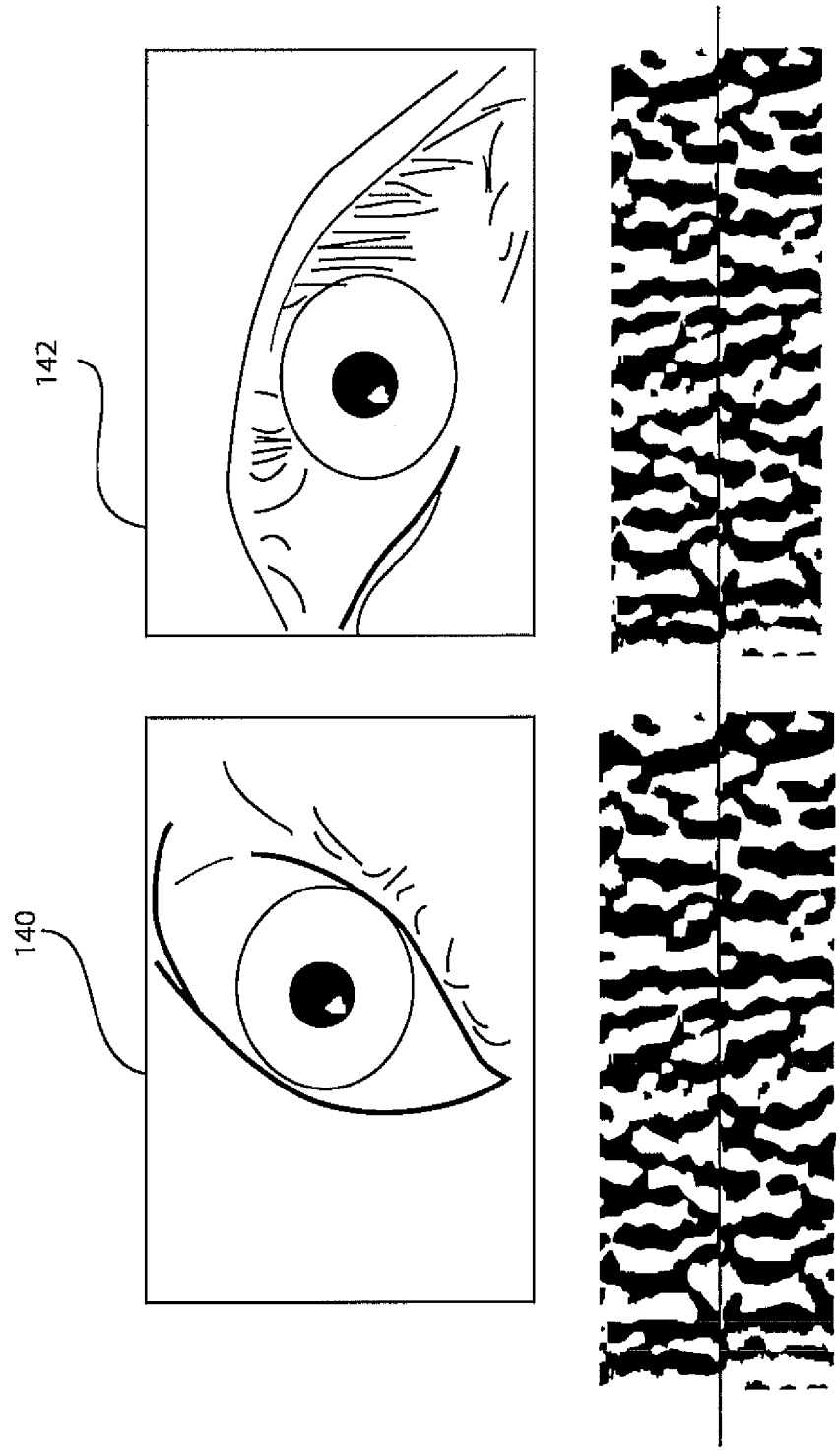
FIG. 2 shows an example of two eyes out of alignment.

Referring to FIG. 2, two instances (140 and 142) of a same eye with drastically different tilts is illustratively shown. To correct for relative rotations between the members of a valid pairs, the Hamming distance is calculated at every possible linear shift (equivalent to a fixed rotation) of one iris code relative to the other within a defined rotation range. The codes are said to be aligned when the distance between them is minimized, and it is this distance which is used as the match score.

In a 1:N (identification) system, a probe iris code is matched with each element in a gallery (database of individuals). The identity of the probe is assigned by its distance to a gallery instance. This is a computationally expensive operation and grows linearly as larger gallery sets are considered.

The number of bit operations is: $b_{ops}=N \cdot h \cdot w \cdot \theta$ (2) where h is the height of the iris code, w is its width, $\theta$ is number of shifts for alignment correction and N is the number of gallery images. When h=128, w=360, $\theta$=20 and N=10,000 (a moderate size database), the number of bit operations is 18 billion. Reducing the number features in the iris code or the gallery size will reduce the number of bitwise operations and thus speed up an identification system.

Figure 3:
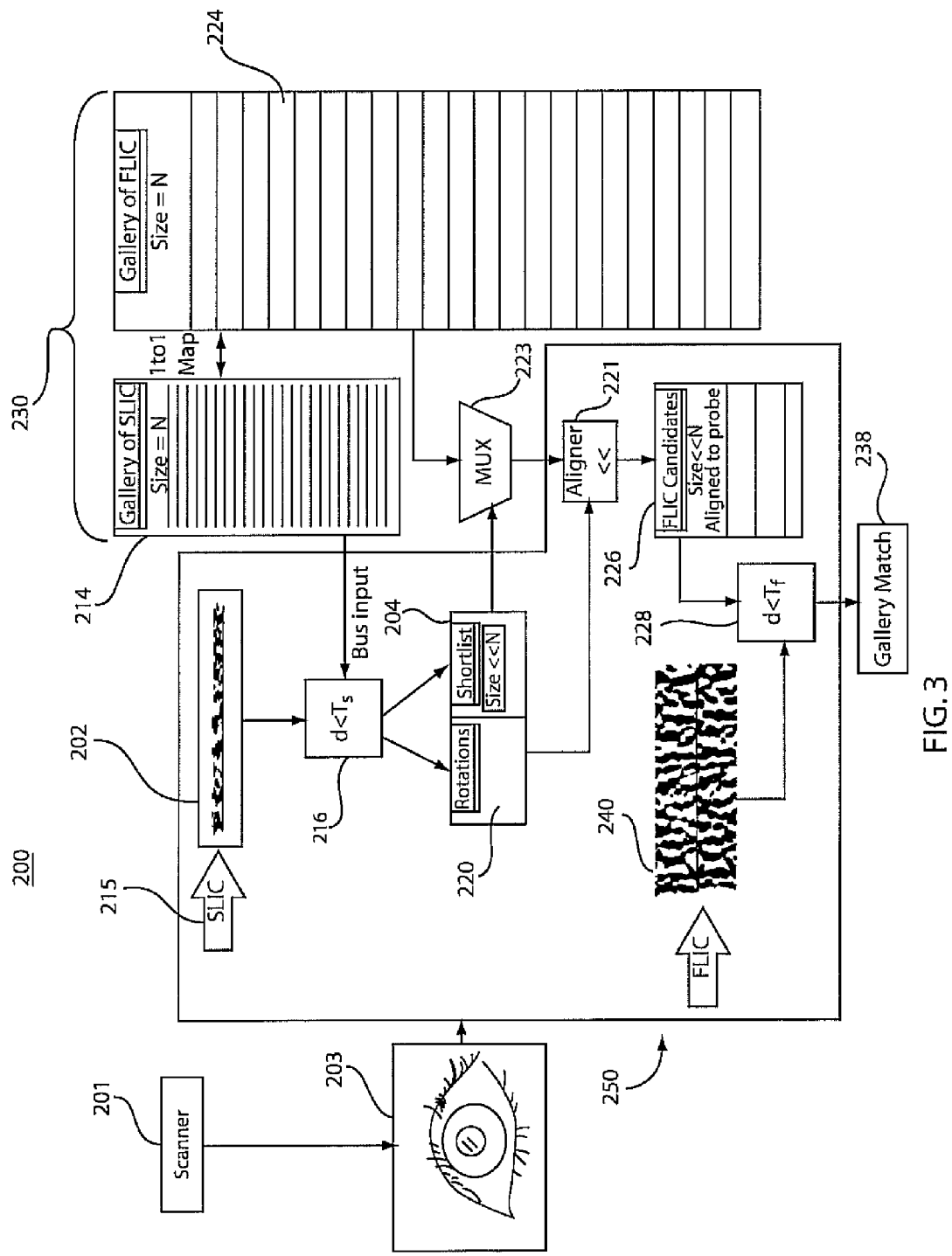
FIG. 3 is a block/flow diagram of a system/method for iris identification in accordance with an illustrative embodiment.

Referring to FIG. 3, a two-stage indexing system and method reduces the number of bitwise operations needed for an identification query. The system 200 performs an identity search in a database 230 of iris images for a probe iris image 203. The database 230 is configured to store a full-length iris code gallery 224 and a compact length iris code gallery 214. A scanner 201 is configured to obtain a full-length iris code 240 for the probe iris image 203. The scanner 201 includes an iris scanner device and may be associated with any security device or system. A transform program 215 is configured to generate a compact iris code 202 from the probe iris image 203. The transform program 215 is designed to obtain the most distinctive characteristics of the iris scan. The transform 215 may include one of more filters to reduce the data set of the probe scan without a significant loss of accuracy. These characteristics may be based on a particular area of the eye or may include a designated sequence of areas of the eye. The compact iris code 202 is generated by transforming the full-length iris code such that a shorter version is provided that retains individuality information.

A processing module 250 is configured to score the compact iris code for the probe image against all compact iris codes in the database, retain a fraction of the database based on score data, and score the full length iris code for the probe image against all the full length iris codes in the retained portion of the database to output best matches to determine an identify associated with the probe iris image. The processing module includes an aligner 221 for generating an alignment value. The alignment value is used in the scoring of the full length iris codes in the retained portion of the database 214. The alignment value accounts for eye rotation in an iris scan.

A full-length iris code search is preferably constrained by using a compact iris code alignment value.

The reduced iris code representation 202 is used to generate a shortlist 204 of candidates. The shortlist 204 is matched to the full-length representation of the iris. Note that this system 200 is independent on the segmentation, encoding or even the distance measure used. Thus, the architecture can be extended to most any iris matching system.

Figure 4:
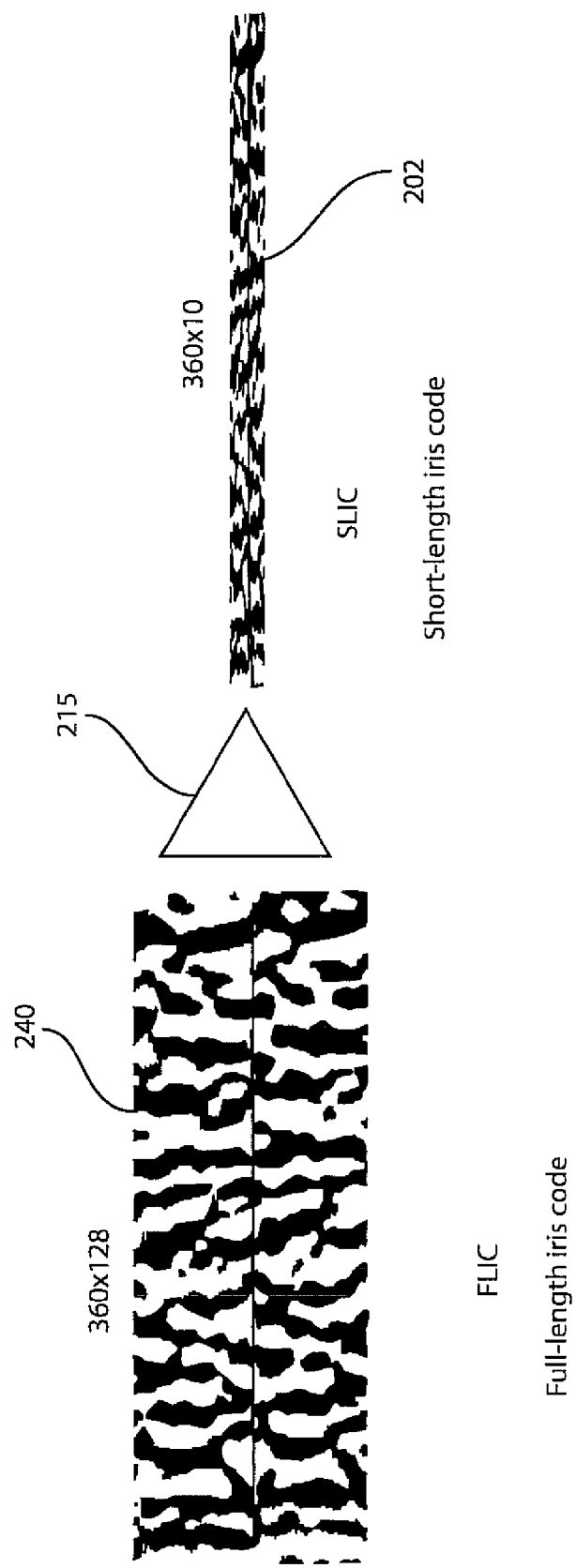
FIG. 4 is a diagram showing a transformation from a full length iris code to a compact or short length iris code in accordance with one embodiment.

Referring to FIG. 4, a short iris representation 202 is illustratively depicted. The short-length iris code (SLIC) transform 215 (FIG. 3) is a code-level operation which preferably samples a middle band of the iris. The SLIC 202 is generated by locating and extracting regions of the iris code with high discriminatory capacity, meaning that these rows most contribute to separating matches from non-matches. From a set of training iris code pairs, Kolmogorov-Smirnov analysis is preferably performed to locate the rows of the iris code with the most information content. A center portion of the iris, mapping to the middle rows of the iris code, was found by the present inventors to be a region where the bulk of the discriminatory texture resided. The rows in this region are then evenly sampled to make the new, shorter iris code. The FLIC 240 (360×128 pixels) is reduced to 360×10 pixels in the SLIC 202.

Referring again to FIG. 3, given a SLIC probe image 202, we attempt to match it to each SLIC member in the gallery 214 (indexing). For such a comparison, slide a gallery SLIC relative to the probe 202 and record the shift at which a distance d between the probe and gallery is minimized. If this distance is below a defined threshold $T_s$ in block 216, we add an entry to a short list 204 including a calculated rotation 220, and a link 222 to a corresponding full length iris code (FLIC) to the gallery 224 is made. The rotation is determined by comparing codes using the aligner 221. The codes from gallery 224 may be multiplexed using a multiplexer 223. Note that the SLIC is significantly smaller (e.g., 12.8 times smaller) than the original FLIC with only slightly less performance. This means that the first stage of gallery search uses less than 8% of the work performed by doing a full length comparison.

Additionally, the rotation alignment 220 found for a SLIC will directly map to an equivalent rotation for the corresponding FLIC. This lets us reduce $\theta$ in a second stage for additional savings (e.g., by a factor of 10 or more). Thus, in the second stage, for each entry in the short list 204, we fetch the FLIC and rotate it by the given value and search only within the restricted range of rotations in a FLIC candidate list 226. As before, the minimum distance (d) found becomes a score for that gallery sample.

At the end, we check for the gallery sample with the lowest such score. If this value is below some reasonable threshold $T_r$ in block 228, we declare the associated gallery entry to be the identity of the probe in block 238.

The number of bit computations of this system is much less than that of the 1: N system. For the two stage system 200 (SLIC stage and FLIC stage), we have to add the number calculations used to generate the aligned short list and the number of calculations needed to compare the full probe to this short list. This total effort is: $b_{ops} = \lfloor N \cdot h_s \cdot w_s \cdot \theta_f \rfloor + \lfloor \mu \cdot h_f \cdot w_f \cdot \theta_s \rfloor$ (3) where $h_s$ and $w_s$ the height and width of the SLIC, N is the size of the gallery, $\theta_f$ is the full alignment search range, $\mu$ is the size of the short list, the FLIC height and width are $h_f$ and $w_f$ and the reduced alignment range is $\theta_s$. This equation assumes that no rotational alignment search is needed in the second stage (FLIC stage).

The primary savings come from reducing N to $\mu$ and reducing $\theta_f$ to $\theta_s$ in the second term. The price for this is the first term, the cost of the full gallery search, which is mitigated by the shorter length of the SLIC. Values yield a load of 8% of the original for the first stage (SLIC stage) plus about another 0.25% for the second stage. As can be seen, in practice it is the first term that usually dominates, suggesting that $\mu$ or $\theta_s$ could be raised somewhat.

Figure 5:
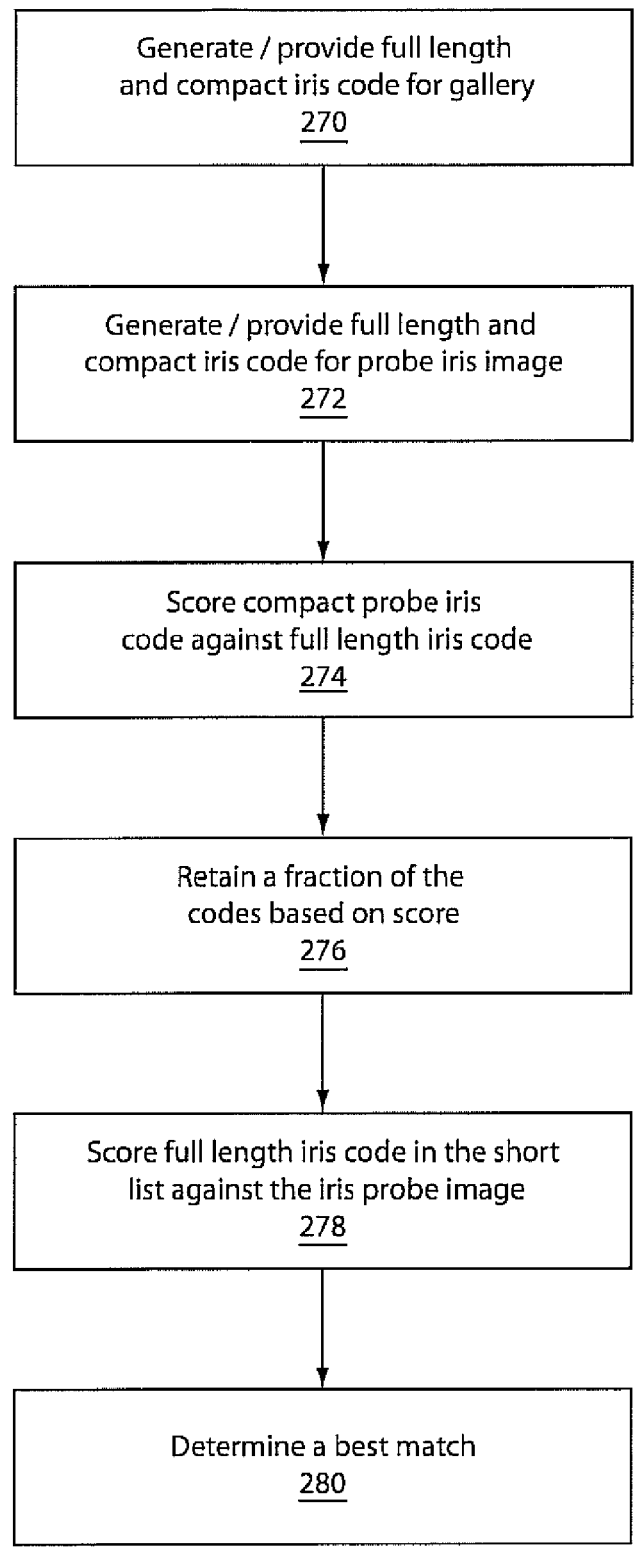
FIG. 5 is a block/flow diagram of another system/method for iris identification in accordance with another illustrative embodiment.

Referring to FIG. 5, a method is provided for performing an identity search in a database of iris images for a probe iris image. In block 270, a full-length iris code and a compact iris code are generated or provided for iris images in a database. In block 272, a full-length iris code and a compact iris code are generated or provided for a probe iris image. The compact code is transformed from the full-length iris code such that a shorter or compact version still retains individuality information. In block 274, the compact iris code for the probe image is scored against all compact iris codes in the database. An alignment value may be generated which is used in the scoring of the full length iris codes in the retained portion of the database. The alignment value accounts for eye rotation in an iris scan. A full-length iris code search may be constrained by using a compact iris code alignment value.

A fraction of the database is retained based on score data in block 276. This fraction includes a shortlist of candidates generated from a gallery along with a list of associated rotational alignment values. In block 278, the full length iris code for the probe image is scored against all the full length iris codes in the retained portion of the database. This includes matching the full length iris probe to the short list of candidates instead of an entire gallery set of the full-length iris codes. The method reduces a number of basic bit comparisons through database down-sampling and alignment search restriction. In block 280, a best match is determined to ascertain an identity associated with the probe image.

Figure 6:
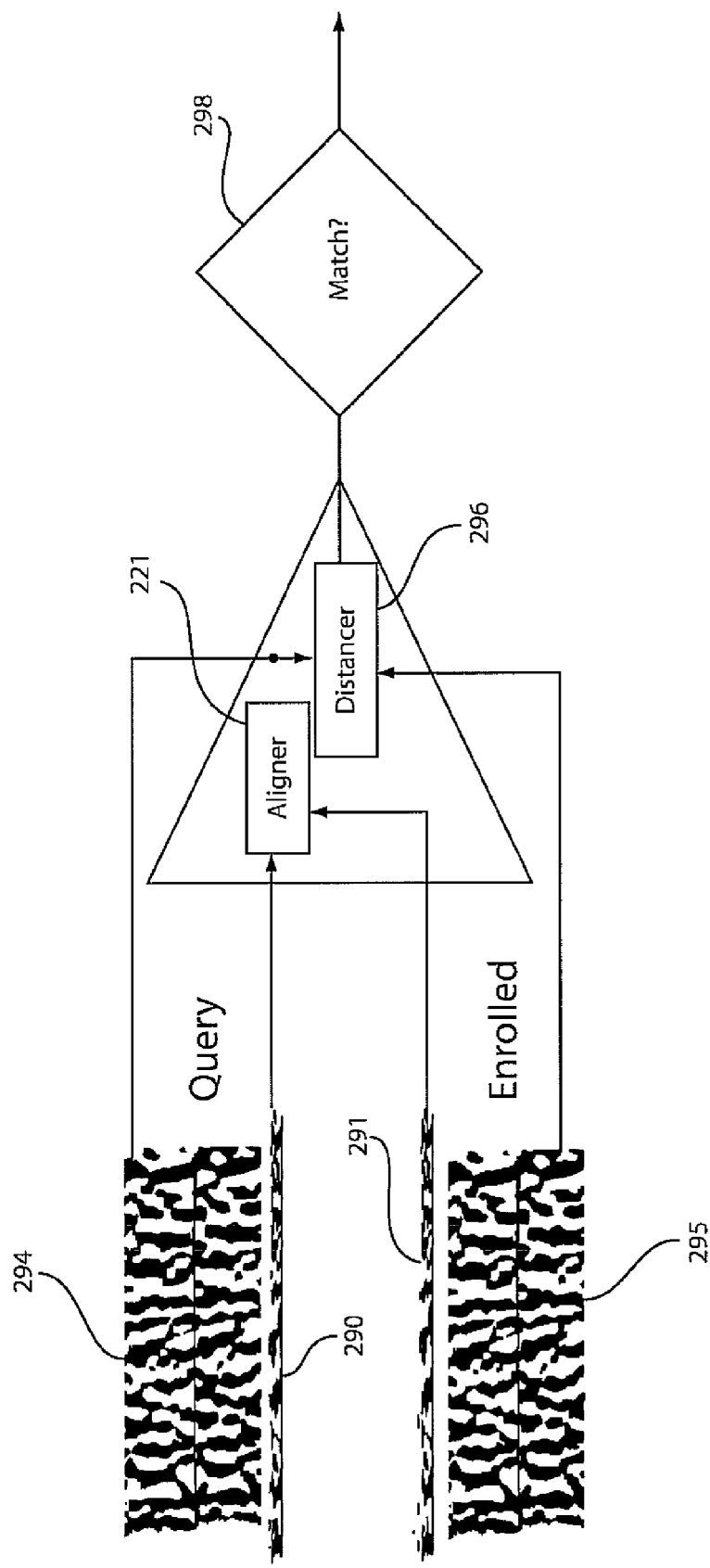
FIG. 6 is a diagram showing of a system which aligns SLICs to compare FLICs in accordance with an illustrative embodiment.

Referring to FIG. 6, the present method aligns the SLICs and compares the corresponding FLICs to get the best match. A probe SLIC 290 is compared with a gallery SLIC 291 using an aligner 221. Then the corresponding FLICs 294 and 295 are compared to using a distancer 296 to determine a match 298.

Workload Reduction: The indexing system in accordance with the present principles has fewer bit operations than the traditional recognition system. In both systems, alignment was corrected for all 360 degrees of possible rotation. Given our operating parameters and equation 2, we can calculate the number of bit operations for the traditional gallery query: $b_{ops} = N \cdot h_f \cdot w_f \cdot \theta b_{ops} = 85 \cdot 128 \cdot 360 \cdot 360 \; b_{ops} = 1.41 \cdot 10^9$ (4).

For the indexing system, the number of bit operations from equation 3 is:

$$b_{ops} = N \cdot h_s \cdot w_s \cdot 2 \cdot \theta + \mu \cdot h_f \cdot w_f b_{ops} = 85 \cdot 10 \cdot 360 \cdot 360 + 9 \cdot 128 \cdot 360 \; b_{ops} = 1.11 \cdot 10^8 \quad (5).$$

When comparing the indexing system to the non-indexing system, there is a performance gain of over 12 times. So, with the same hardware the identity search can be computed 12× faster, or, conversely, for the same response time 12× less hardware (and hence cost) is needed.

The systems and methods in accordance with the present principles provide for rapid iris identity matching. Starting with the full iris code, we create a shorter version that retains most of the individuality information. We then use this to generate a shortlist of candidates from the gallery, along with a list of associated rotational alignment values. The second stage then matches the full length iris template to the short list instead of the entire gallery set. We show how this results in a reduction in the number of basic bit comparisons, both through database down-sampling and alignment search restriction. In the present implementations, the number of bit operations was reduced from 1.4 billion to a mere 100 million without a large impact on the recognition rate. The system as described can be retrofitted to many existing iris systems to realize large savings in time and/or cost.

Having described preferred embodiments for an iris recognition system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for performing an identity search in a database of iris images for a probe iris image, comprising:
generating a full-length iris code and a compact iris code for iris images stored in a computer readable storage medium in a database;
generating a full-length iris code and a compact iris code for a probe iris image;
scoring the compact iris code for the probe image against all compact iris codes in the database;
retaining a fraction of the database based on score data; and
scoring the full length iris code for the probe image against all the full length iris codes associated with the compact iris codes in the retained portion of the database.

2. The method as recited in claim 1, wherein scoring the compact iris code includes generating an alignment value, where the alignment value is used in the scoring of the full length iris codes in the retained portion of the database.

3. The method as recited in claim 2, wherein the alignment value from the compact iris code is directly used for the full-length iris code.

4. The method as recited in claim 2, wherein the alignment value accounts for eye rotation in an iris scan.

5. The method as recited in claim 2, further comprising constraining a full-length iris code search by using a compact iris code alignment value.

6. The method as recited in claim 1, wherein the compact iris code is generated by transforming the full-length iris code such that a shorter version is provided that retains individuality information.

7. The method as recited in claim 1, wherein scoring the full length iris code includes matching the full length iris probe to the retained portion in a short list instead of an entire gallery set of the full-length iris codes.

8. The method as recited in claim 1, further comprising determining a best match to ascertain an identity associated with the probe image.

9. A computer readable storage medium comprising a computer readable program for performing an identity search in a database of iris images for a probe iris image, wherein the computer readable program when executed on a computer causes the computer to perform the steps of:
generating a full-length iris code and a compact iris code for iris images in a database;
generating a full-length iris code and a compact iris code for a probe iris image;
scoring the compact iris code for the probe image against all compact iris codes in the database;
retaining a fraction of the database based on score data; and
scoring the full length iris code for the probe image against all the full length iris codes in the retained portion of the database.

10. The computer readable storage medium as recited in claim 9, wherein scoring the compact iris code includes generating an alignment value, where the alignment value is used in the scoring of the full length iris codes in the retained portion of the database.

11. The computer readable storage medium as recited in claim 10, wherein the alignment value accounts for eye rotation in an iris scan.

12. The computer readable storage medium as recited in claim 10, wherein the alignment value from the compact iris code is directly used for the full-length iris code.

13. The computer readable storage medium as recited in claim 10, further comprising constraining a full-length iris code search by using a compact iris code alignment value.

14. The computer readable storage medium as recited in claim 9, wherein the compact iris code is generated by transforming the full-length iris code such that a shorter version is provided that retains individuality information.

15. The computer readable storage medium as recited in claim 9, wherein the method reduces a number of basic bit comparisons through database down-sampling and alignment search restriction.

16. The computer readable storage medium as recited in claim 9, further comprising determining a best match to ascertain an identity associated with the probe image.

17. A system for performing an identity search in a database of iris images for a probe iris image, comprising:
a database configured to store a full-length iris code gallery and a compact length iris code gallery in a computer readable storage medium;
a scanner configured to obtain a full-length iris code for a probe iris image;
a transform program configured to generate a compact iris code from the probe iris image; and
a processing module configured to score the compact iris code for the probe image against all compact iris codes in the database, retain a fraction of the database based on score data, and score the full length iris code for the probe image against all the full length iris codes in the retained portion of the database to output best matches to determine an identify associated with the probe iris image.

18. The system as recited in claim 17, wherein the processing module includes an aligner for generating an alignment value, where the alignment value is used in the scoring of the full length iris codes in the retained portion of the database.

19. The system as recited in claim 18, wherein the alignment value accounts for eye rotation in an iris scan.

20. The system as recited in claim 17, wherein the compact iris code is generated by transforming the full-length iris code such that a shorter version is provided that retains individuality information.

21. The system as recited in claim 17, wherein the fraction of the database includes a shortlist of candidates from a gallery along with a list of associated rotational alignment values.

22. The system as recited in claim 21, wherein the full length iris probe is matched to the short list instead of an entire gallery set of the full-length iris codes.

23. The system as recited in claim 17, wherein the system is configured to determine a best match to ascertain an identity associated with the probe image.

* * * * *